United States Patent
Sugawara et al.

[11] Patent Number: 5,344,223
[45] Date of Patent: Sep. 6, 1994

[54] ANTI-SKID BRAKE CONTROL METHOD

[75] Inventors: Ryuta Sugawara; Satoshi Akimoto, both of Higashimatsuyama, Japan

[73] Assignee: Jidosha Kiki Co., Ltd., Tokyo, Japan

[21] Appl. No.: 109,473

[22] Filed: Aug. 20, 1993

Related U.S. Application Data

[63] Continuation of Ser. No. 882,861, May 14, 1992, abandoned.

Foreign Application Priority Data

May 16, 1991 [JP] Japan ................... 3-111984

[51] Int. Cl.$^5$ ............................ B60T 8/68; B60T 8/64
[52] U.S. Cl. .................... 303/103; 303/100; 303/109; 303/111; 303/96; 303/110; 188/181 C
[58] Field of Search ............... 303/96, 91, 100, 102, 303/103, 106, 107, 109, 110, 97–98, 111; 364/426.01, 426.02, 426.03; 188/181 A, 181 C

[56] References Cited

U.S. PATENT DOCUMENTS

| | | | |
|---|---|---|---|
| 4,877,295 | 10/1989 | Yoshino | 303/109 |
| 4,980,831 | 12/1990 | Katayama et al. | 303/106 X |
| 4,991,910 | 2/1991 | Shimanuki et al. | 303/105 X |
| 5,015,042 | 5/1991 | Yoshino | 303/109 X |
| 5,065,327 | 11/1991 | Yahagi et al. | 303/106 X |
| 5,123,715 | 6/1992 | Okubo | 303/103 X |

*Primary Examiner*—Douglas C. Butler
*Attorney, Agent, or Firm*—Varndell Legal Group

[57] ABSTRACT

In the present invention, an estimated car body speed is obtained on the basis of the highest wheel speed selected from three wheel speeds including the lowest of the wheel speeds of left and right rear wheels and the wheel speeds of left and right front wheels. Because the car body speed is obtained on the basis of wheel speed selected by Select-High of three channels of wheel speeds of the two front wheels and wheel speed by Rear Select-Low, wheel speed of outer rear wheel, which is much higher than the speed of the gravity center of the car body when a car is turning, is excluded, and the estimated car body speed thus obtained is closer to the speed of the gravity center of the car body.

9 Claims, 1 Drawing Sheet

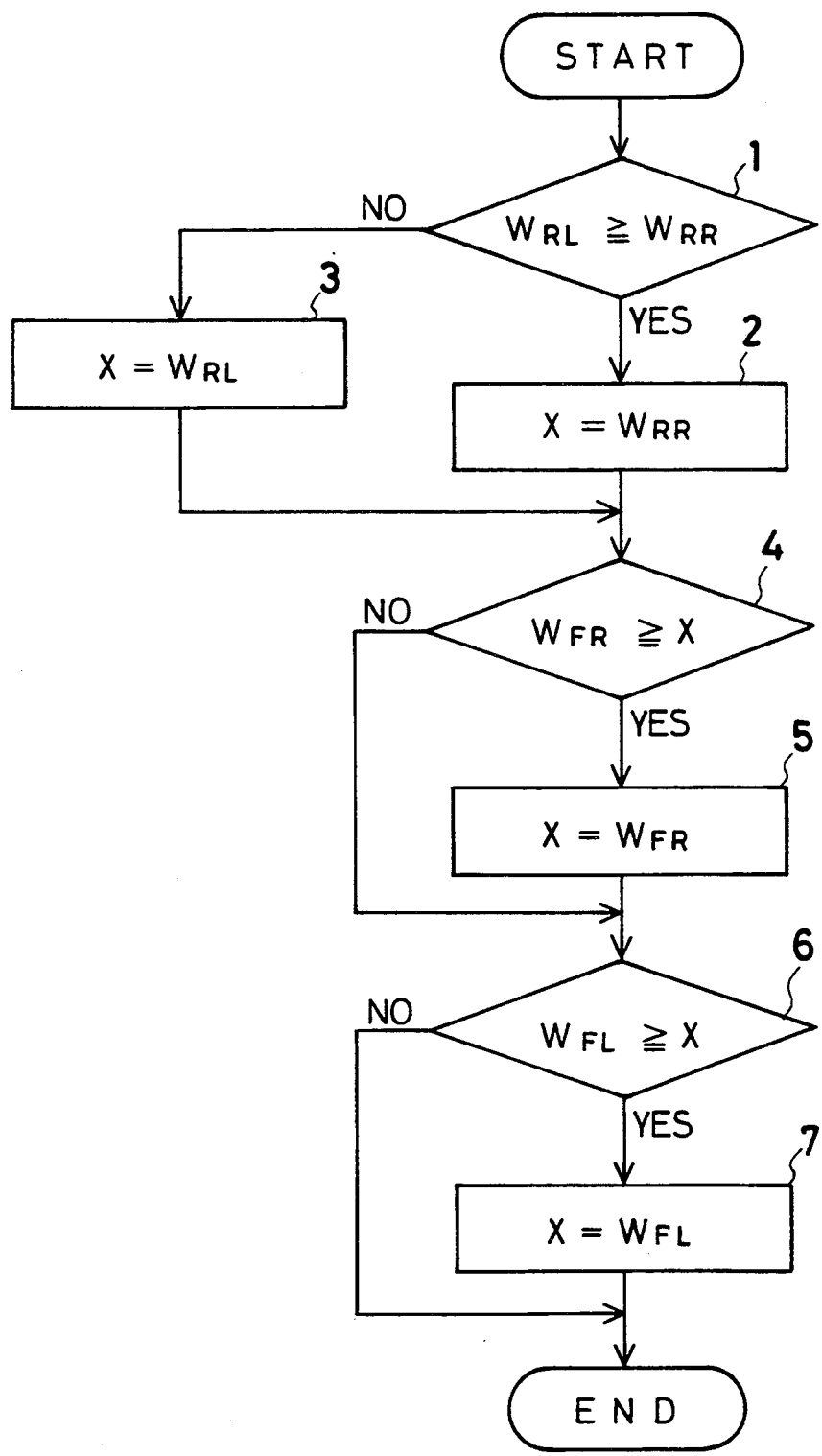

ANTI-SKID BRAKE CONTROL METHOD

This application is a continuation of Ser. No. 07/882,861, filed May 14, 1993, now abandoned.

BACKGROUND OF THE INVENTION

The present invention relates to a method for anti-skid brake control, in which a car body speed is estimated from wheel speed information at braking, and a value relating to skidding of the wheels such as a wheel slipping rate is obtained from the estimated car body speed, and the braking is controlled according to this value, and in particular, it relates to an anti-skid brake control method for performing anti-skid brake control properly even when the car is steered during the anti-skid brake control.

Anti-skid brake control is performed as follows: In general, when it is detected that the wheels are in skid condition during braking, the braking force on the wheels is decreased to eliminate the skid condition. By increasing the braking force again thereafter, the steering of the vehicle is stabilized and braking distance is made as short as possible.

When this anti-skid brake control is performed, it is necessary to obtain a car body speed, which serves as a reference for the control, but it is difficult to find an accurate car body speed when the wheels are under skid condition during braking. Therefore, in performing anti-skid brake control, it has been normally practiced to estimate a car body speed, and anti-skid brake control is performed according to the estimated car body speed. In this case, various methods have been adopted to estimate the car body speed. One of the methods is to estimate the car body speed by Select-High. The method by Select-High is to obtain the estimated car body speed based on the highest wheel speed among the four front and rear wheels.

When preparing the estimated car body speed by the method of Select-High, if steering is performed during anti-skid brake control, it is possible that the speed of the wheel running at the outermost course becomes the highest. Thus, the estimated car body speed is prepared based on the wheel speed of the wheel running at the outermost course. In this case, the speed of outer rear wheel is usually much faster than the speed of the gravity center of the car body when the car is turning, and the estimated car body speed is obtained based on the speed of this outer rear wheel in most cases.

However, a slip ratio is obtained from the estimated car body speed, and the slip ratio thus obtained is higher than the actual slip ratio. Accordingly, if anti-skid brake control is performed with this slip ratio, brake cylinder pressure of each wheel is decreased too much, and this causes insufficient deceleration of the wheels. In particular, braking force is not sufficiently applied on the outer front wheel, which most urgently needs the braking force when the car is turning, and the braking force on the rear wheels is also not enough.

SUMMARY OF THE INVENTION

It is an object of the present invention to provide a method for anti-skid brake control, which can ensure proper wheel deceleration in anti-skid brake control when a vehicle is turning.

To attain the above object, the anti-skid brake control method according to the present invention is for performing anti-skid brake control based on a value relating to skid of wheels such as slip ratio of a wheel, which is obtained from a car body speed estimated from wheel speed information at braking, and it is characterized in that the highest wheel speed is selected from three wheel speeds including the lowest of wheel speeds of left and rear wheels and wheel speeds of left and right front wheels, and the car body speed is estimated on the basis of this highest wheel speed.

In the anti-skid brake control method according to the present invention with the above arrangement, the estimated car body speed is obtained on the basis of the highest wheel speed selected from three wheel speeds including the lowest of the wheel speeds of left and right rear wheels and the wheel speeds of left and right front wheels. As the result, the wheel speed of the outer rear wheel, which is much faster than the speed of the gravity center of the car body when the car is turning, is excluded, and the estimated car body speed thus obtained is closer to the speed of the gravity center of the car body. When anti-skid brake control is performed using this estimated car body speed, it is possible to achieve proper braking force in the anti-skid brake control when the car is turning and to more adequately control deceleration of the wheels.

Particularly, in the anti-skid brake control when the car is turning, sufficient braking force can be applied on the outer wheels, which most urgently need the braking force, and also to obtain braking force on the rear wheels.

Still other objects and advantages of the invention will in part be obvious and will in part be apparent from the specification.

The invention accordingly comprises the features of construction, combinations of elements, and arrangement of parts which will be exemplified in the construction hereinafter set force, and the scope of the invention will be indicated in the claims.

BRIEF DESCRIPTION OF THE DRAWINGS

The single FIGURE is a flow chart used for an embodiment of anti-skid brake control method according to the present invention for obtaining estimated car body speed from wheel speed information.

DESCRIPTION OF THE PREFERRED EMBODIMENT

In the following, description will be given on an embodiment of the present invention in connection with the drawing.

As shown the FIGURE, it is judged in the Step 1 to obtain the estimated car body speed whether or not wheel speed $W_{RL}$ of the left rear wheel is higher than the wheel speed $W_{RR}$ of the right rear wheel. If it has been judged that the wheel speed $W_{RL}$ of the left rear wheel is higher than the wheel speed $W_{RR}$ of the right rear wheel, a temporary value X is set to $W_{RR}$ in the Step 2. If the wheel speed $W_{RL}$ of the left rear wheel is not higher than the wheel speed $W_{RR}$ of the right rear wheel in the Step 1, a temporary value X is set to $W_{RL}$ in the Step 3.

Next, it is judged whether the wheel speed $W_{FR}$ of the right front wheel is higher than the temporary value X or not in the Step 4. If it is judged that the wheel speed $W_{FR}$ of the right front sheel is higher than the temporary value X, the temporary value X is set to $W_{FR}$ in the Step 5. If the wheel speed $W_{FR}$ of the right front wheel is not higher than the temporary value X in the Step 4, the temporary value X is kept unchanged.

Next, it is judged whether the wheel speed $W_{FL}$ of the left front wheel is higher than the temporary value X or not. If it is judged that the wheel speed $W_{FL}$ of the left front wheel is higher than the temporary value X, the temporary value X is set to $W_{FL}$ in the Step 7. If it is judged that the wheel speed $W_{FL}$ of the left front wheel is not higher than the temporary value X in the Step 6, the temporary value X is kept unchanged, and the estimated car body speed is obtained on the basis of this final temporary value X.

In the present embodiment, therefore, the estimated car body speed is obtained on the basis of the highest wheel speed selected from three wheel speeds including the lowest of the wheel speeds of left and right rear wheels and the wheel speeds of left and right front wheels. In this way, the car body speed is obtained on the basis of the wheel speed, which has been selected by Select-High of three channels, i.e. wheel speeds of the two front wheels and the wheel speed by Rear Select-Low. Because the wheel speed of the outer rear wheel, which runs much higher than the speed of the gravity center of car body when the car is turning, is excluded, the estimated car body speed thus obtained is closer to the speed of the gravity center of the car body.

By the anti-skid brake control using this estimated car body speed, it is possible to obtain a proper braking force in the anti-skid brake control when the car is turning. Accordingly, it is possible to more adequately control deceleration of the wheels. In particular, in the anti-skid brake control when the car is turning, sufficient braking force is applied on outer front wheel which most urgently needs the braking force, and the braking force on the rear wheels is also obtained.

As it is evident from the above description, when the estimated car body speed is prepared, the wheel speed of outer rear wheel, which runs much higher than the speed of the gravity center of the car body when the car is turning, is excluded according to the anti-skid brake control method of the present invention, and the estimated car body speed thus obtained is closer to the speed of the gravity center of the car body. Thus, it is possible to obtain a proper braking force in the anti-skid brake control when the car is turning by the anti-skid brake control using this estimated car body speed, and also it is possible to more adequately control deceleration of the wheels. Particularly, in the anti-skid brake control when the car is turning, sufficient braking force is obtained on outer front wheel, which most urgently needs the braking force, and braking force is also obtained on the rear wheel.

What we claim is:

1. A method for performing anti-skid brake control in a vehicle when the vehicle is turning, which comprises:
    braking while turning said vehicle,
    detecting when wheels of said vehicle are in a skid condition,
    detecting wheel speeds of front and rear wheels of said vehicle,
    comparing wheel speeds of said rear wheels and selecting a lowest rear wheel speed based thereon,
    comparing wheel speeds of said front wheels and said lowest rear wheel speed and selecting a highest wheel speed based thereon,
    estimating vehicle body speed based on said selected highest wheel speed, and
    increasing and decreasing braking force on said wheels based on said estimated vehicle speed for stabilizing steering of said vehicle and shortening braking distance.

2. The method for performing anti-skid brake control according to claim 1, wherein said wheel speeds of said front and rear wheels of said vehicle are detected at all times when performing said anti-skid brake control.

3. A method for performing anti-skid brake control in a vehicle comprising:
    (a) increasing braking force on front and rear wheels of said vehicle for stopping said vehicle,
    (b) detecting wheel speeds of said front and rear wheels of said vehicle during braking,
    (c) detecting when said wheels are in a skid condition,
    (d) comparing wheel speeds of said rear wheels and selecting a lowest rear wheel speed,
    (e) comparing only wheel speeds of said front wheels and said lowest rear wheel speed selected in step (d) and selecting a highest wheel speed based thereon, and
    (f) estimating vehicle body speed based on said selected highest wheel speed of step (e),
    (g) decreasing braking force on said front and rear wheels based on said estimated vehicle body speed to eliminate said skid condition, and
    (i) again increasing braking force on front and rear wheels of said vehicle for stabilizing steering of said vehicle and for stopping said vehicle.

4. The method for performing anti-skid brake control according to claim 3, wherein said vehicle is turning during said steps (a) through (i).

5. The method for performing anti-skid brake control according to claim 3, wherein said lowest rear wheel speed selected in step (d) is an inner wheel relative to said turning of said vehicle.

6. The method for performing anti-skid brake control according to claim 3, wherein said wheel speeds of said front and rear wheels of said vehicle are detected at all times when performing said anti-skid brake control.

7. In a method for performing anti-skid brake control including detecting wheel speeds of a vehicle during braking, which includes estimating a vehicle body speed from the detected wheel speeds, obtaining a value of wheel skidding from the estimated vehicle body speed, and decreasing braking force to eliminate the wheel skidding and increasing braking force to stabilize steering of the vehicle and shorten braking distance, wherein the improvement comprises the estimating of the vehicle body speed by the following steps:
    detecting when wheels of the vehicle are in a skid condition,
    detecting wheel speeds of front and rear wheels of the vehicle,
    comparing wheel speeds of the rear wheels and selecting a lowest rear wheel speed based thereon,
    comparing wheel speeds of the front wheels and the lowest rear wheel speed and selecting a highest wheel speed based thereon, and
    estimating vehicle body speed based on the selected highest wheel speed.

8. The method for performing anti-skid brake control according to claim 7, wherein the vehicle is turning when while carrying of the steps of the estimating of the vehicle body speed.

9. The method for performing anti-skid brake control according to claim 7, wherein said wheel speeds of said front and rear wheels of said vehicle are detected at all times when performing said anti-skid brake control.

* * * * *